(12) United States Patent
Jensen

(10) Patent No.: US 9,931,586 B2
(45) Date of Patent: Apr. 3, 2018

(54) METHOD AND DEVICE FOR FILTRATION OF AIR-CONTAINING OIL

(75) Inventor: Søren Hallberg Jensen, Copenhagen (DK)

(73) Assignee: C.C JENSEN A/S, Svendborg (DK)

( * ) Notice: Subject to any disclaimer, the term of this patent is extended or adjusted under 35 U.S.C. 154(b) by 155 days.

(21) Appl. No.: 12/922,815

(22) PCT Filed: Mar. 19, 2009

(86) PCT No.: PCT/DK2009/050062
§ 371 (c)(1),
(2), (4) Date: Sep. 16, 2010

(87) PCT Pub. No.: WO2009/115092
PCT Pub. Date: Sep. 24, 2009

(65) Prior Publication Data
US 2011/0017682 A1    Jan. 27, 2011

(30) Foreign Application Priority Data

Mar. 19, 2008  (EP) .................................... 08005141

(51) Int. Cl.
*B01D 19/00* (2006.01)
*F16N 39/06* (2006.01)
*F16H 57/04* (2010.01)

(52) U.S. Cl.
CPC ............. *B01D 19/00* (2013.01); *F16N 39/06* (2013.01); *F16H 57/0402* (2013.01)

(58) Field of Classification Search
CPC ...... B01D 19/00; B01D 19/0031; F16N 19/06
USPC ...................... 210/637, 741, 808, 137, 416.5
See application file for complete search history.

(56) References Cited

U.S. PATENT DOCUMENTS

| | | | | |
|---|---|---|---|---|
| 4,204,962 A | * | 5/1980 | Ford | 210/316 |
| 4,618,431 A | * | 10/1986 | Hindman et al. | 210/741 |
| 5,427,683 A | * | 6/1995 | Gershon et al. | 210/264 |
| 6,294,090 B1 | * | 9/2001 | Nussbaumer et al. | 210/321.83 |
| 2006/0137939 A1 | * | 6/2006 | Smolong et al. | 184/6.12 |
| 2008/0290013 A1 | * | 11/2008 | Stausberg et al. | 210/167.04 |

FOREIGN PATENT DOCUMENTS

| | | |
|---|---|---|
| DE | 19511450 A1 | 10/1996 |
| EP | 0121105 B1 | 12/1986 |
| WO | 9935435 A1 | 7/1999 |
| WO | 0129380 A1 | 4/2001 |
| WO | 2004070231 A2 | 8/2004 |

* cited by examiner

*Primary Examiner* — Peter Keyworth
(74) *Attorney, Agent, or Firm* — Nath, Goldberg & Meyer; Jerald L. Meyer; Stanley N. Protigal

(57) ABSTRACT

A method and device for removal of solid contaminants from an air-containing, contaminated oil by leading the oil to the inlet of a filter separating the contaminated oil in a solid phase, which is retained by the filter, and a liquid phase, which passes the filter and leaves as a filtrate through the outlet of the filter. An increased pressure is added on the filtrate outlet. The filtration is more efficient as disturbing air bubbles are avoided.

13 Claims, 2 Drawing Sheets

METHOD AND DEVICE FOR FILTRATION OF AIR-CONTAINING OIL

This is a National Phase Application filed under 35 USC 371 of International Application No. PCT/DK2009/050062, filed on Mar. 19, 2009, an application claiming foreign priority benefits under 35 USC 119 of European Application No. 08005141.0, filed on Mar. 19, 2008, the content of each of which is hereby incorporated by reference in its entirety.

TECHNICAL FIELD

The present invention relates to a method and device for removal of solid contaminants from air-containing, contaminated oil by leading the oil to the inlet of a pump and pumping it further to the inlet of a filter separating the contaminated oil into a solid phase, which is retained by the filter, and a liquid phase, which passes the filter and leaves as a filtrate through the outlet of the filter.

BACKGROUND ART

It is well-known to use oil filters to decontaminate oil that contains suspended impurities. A major application is the use of such filters for filtration of machinery oil such as hydraulic oil and the oil used in the lubrication system of engines, for example in gears and bearings. Efficient filtration of oil in any oil-filled system is essential for enhancing longevity and performance.

DE 195 11 450 (Münkel) discloses a bypass-mounted filter assembly for filtering fluid from a hydraulic-fluid reservoir in a bypass line, the filter having a motor-driven pump and a rigidly mounted housing which is closed off by a cover and which contains a replaceable filter element. The filter housing is connected directly to the pump, and forms a vessel designed to hold the clean fluid when the filter element is changed in order to make it possible to replace the filter element or renew the filter simply without any danger of contaminating the clean oil downstream of the filter. In an embodiment, a differential pressure gauge monitors the pressure difference between the inlet and outlet sides of the filter. In case a specified difference pressure value is exceeded, an electric signal can be used to stop the motor of the pump. A check valve prevents oil from running back from a higher located tank for the filtrated oil. DE 195 11 450 does not disclose or suggest how to solve filtration problems in case of an oil having a content of air, which may impair the filtration.

DE 199 33 620 (Locher) discloses an oil filter for hydraulically operated machines with rotating parts, especially automatic gear boxes of vehicles, having a membrane inserted in it to remove air bubbles present in the oil stream. A membrane area of one dm² removes about 20 ml/h air. Such low capacity makes this solution unsuitable for use in large scale.

EP1424116 (Hesterwerth et al.) discloses an air bubble separator with an oil collecting chamber for degassing oil through an air volume provided over the oil. Retaining plates arranged behind each other in the flow direction are provided in an inlet region behind an oil inlet. A flow channel with alternating wide and narrow free cross-sectional dimensions is provided in the flow direction behind the retaining plates. Such separator is unsuitable in case of very small air bubbles.

WO 99/35435 (Salavamäki et al.) discloses a method for bringing the content of air in lubrication oil or hydraulic oil into a state of equilibrium in during circulation. By this method, air bubbles of an order of magnitude of 1.5 mm or larger rise to the oil surface in the oil tank, whereas smaller bubbles are dissolved under the hydraulic pressure at the bottom of the sufficiently high level of oil in the tank. This pressure is in the order of 0.5 bar (0.05 MPa). FIG. 4 of WO 99/35435 shows a filter for cleaning the oil taken pumped from the bottom of the oil tank. After the filter is a cooler. However, this paper is silent about the particular filtration conditions.

Today's machinery must be fast, accurate and economical. This increases the requirements to machinery oils such as hydraulic oil and lubrication oil, as the machinery tolerances become finer, such as about 4 µm and often below 3 µm. Since particles of this size can cause long-term wear, reducing their number to as few as possible is a priority.

As an example, the gearbox of a wind turbine is lubricated with relatively high viscous oil (such as an average viscosity at 40° C. of 320 mm²/s; ISO VG 320 according to DIN 51 519). This oil can be cleaned using a 3 µm filter insert. By one passage through such filter, the removal of present particles larger than 4 µm by laboratory experiments is typically a drop of 3 to 4 ISO 4406 classes (for example from range number 19 to 16 or 15, see table 1 below). However, in practice the efficiency is often found to be drastically lower. This means that several passages through the filter are needed to obtain acceptable oil cleanliness. This is very costly. Accordingly, there is still a demand for a more efficient method for filtration of contaminated oil.

The present invention is based on the consideration of the above-mentioned discrepancy between the results in the laboratory and oil filtration in practice. In this connection, it was decided to analyse possible problems caused by incorporation of air in the oil during working. A problem with such analysis is to obtain representative oil samples when the oil is not only contaminated with suspended solid particles, but also contains both dissolved air and also air bubbles. When collecting such samples, the air bubbles may fuse together to larger bubbles and rise to the surface of the oil on standing.

As mentioned above, the gearbox in a wind turbine is lubricated with an oil having a relatively high viscosity. It was found that when the wind turbine is working, air is incorporated in the oil in amounts of typically 5 to 20 vol/vol %. These amounts of air are present as smaller and larger bubbles of free air. Typically, the oil also contains 8 to 12 vol/vol % air dissolved in the oil at atmospheric pressure. These amounts are not included in the 5 to 20 vol/vol % of air bubbles. It was further found that the incorporated air bubbles in the gearbox are agitated to form very fine bubbles giving turbid oil, which appears as froth. The suspended air bubbles may have a diameter down to 1 µm.

Based on these findings, experimental air-containing oil was prepared as a froth using a small pump mixing air into the oil. Using this air-containing oil froth, the filtration results were more in agreement with those found in practice, i.e. with a similar bad efficiency.

Having thus realised that the filtration problems were due to the content of air bubbles in the oil, one might conclude that the air bubbles had to be removed before the filtration using one of the above-mentioned complicated, non-efficient and expensive methods for such removal.

However, especially when the air bubbles are very fine, as the case is for the froth of lubrication oil with very small air bubbles from the gearbox of wind turbines, such separation of air bubbles from high viscosity oil is very troublesome and time consuming.

Thus, there is a need for a less complicated solution.

The object of the present invention is to provide a method and a device for simple, but still efficient removal of solid contaminants from air-containing oil, especially lubrication oil or hydraulic oil.

In the present application, the term "air-containing oil" refers to oil with an amount of non-dissolved free air bubbles of at least 0.2 vol/vol % normally appearing as a froth.

BRIEF DESCRIPTION OF THE INVENTION

Accordingly, the present invention relates to a method for removal of solid contaminants from air-containing, contaminated oil by leading the oil to the inlet of a pump and pumping it further to the inlet of a filter separating the contaminated oil into a solid phase, which is retained by the filter, and a liquid phase, which passes the filter and leaves as a filtrate through the outlet of the filter, wherein the filtrate in the outlet of the filter is maintained at a pressure ensuring that all air is dissolved in the filtrate.

In the present specification and in the claims, the pressure of the filtrate in the outlet that is immediately after the filter is also termed the "back pressure". This back pressure ensures that all air remains dissolved, thus no free air bubbles are formed when the oil passes through the filter.

In a preferred embodiment, the increased "back pressure" is obtained by positioning a conventional back pressure valve after the filter.

By this back pressure, all air bubbles or at least a substantial part thereof is believed to be dissolved in the oil. Since an air bubble that is subjected to sub-saturated oil, will slowly dissolve into this oil, the time at which the oil is exposed to the increase in pressure, should be of such a length, that the air bubbles dissolve into the oil.

Normally, the skilled person would not deliberately provide an increased back pressure after a filter. Nevertheless, this is what is done in connection with the present invention, and it was surprisingly found that the filtration efficiency is substantially improved when such increased pressure is applied to the filtrate side of the filter Preferably, the back pressure is at least 0.3 bar (0.03 MPa), such as at least 0.4 bar, 0.5 bar or 0.6 bar (0.04, 0.05 or 0.06 MPa), more preferably above 0.8 bar (0.08 MPa) such as above 1.0 bar or 1.2 bar (0.1 or 0.12 MPa), and generally not more than 5 bar (0.5 MPa), preferably not more than 2 bar (0.2 MPa) such as not more than 1.8 bar (0.18 MPa).

Without such back pressure on the filtrate side, maintaining the air in a dissolved state, the pressure drop through the filter causes the air bubbles to expand to a larger volume and probably also releases dissolved air. This expansion of air tends to pull the solid particles to be filtrated through the pores or openings of the filter. In this way, a large amount of contaminating solid particles are not separated efficiently from the oil and thus remain in the filtrate. Solid contaminants trapped in the filter during filtration in conditions without air bubbles also tend to be released once air bubbles are added to the oil again.

The pressure drop through a filter depends on the filter in question. It was found that when the pressure was raised on the filtrate side, the pressure before the filter was correspondingly increased and the flow rate (flux) through the filter was maintained. The effect of the pressure drop through the filter did not cause air bubbles to expand when back pressure was used. Probably, this was because the air in the bubbles was dissolved under the pressure before the filter.

According to a preferred embodiment, the back pressure of the filtrate in the outlet is maintained by means of a hydraulic resistance downstream from the filter.

The present invention also provides a device for removal of solid contaminants from air-containing, contaminated oil having an inlet to a pump to lead the oil through a conduct to the inlet of a filter separating the contaminated oil into a solid phase, which is retained by the filter, and a filtrate, and a conduit for the filtrate connected to the outlet of the filter, wherein the conduit has means to maintain the filtrate in the outlet of the filter at a pressure ensuring that all air is dissolved in the filtrate.

As explained above, such pressure hinders liberation of air bubbles from the oil during the passage of the filter.

In a preferred embodiment, the means to maintain the filtrate at such back pressure includes a hydraulic resistance, such as a valve, an orifice plate, or a narrowing of the conduit, downstream from the filter in the conduit.

In a more preferred embodiment, the means to maintain an increased pressure of the filtrate is a conventional back pressure valve.

The present invention represents a new approach to filtration problems resulting from air bubbles in the oil to be filtrated. The difficult separation of incorporated air from the oil can simply be omitted. Instead, the oil is pressurized to partially or completely dissolve the air in the oil both at the inlet to the filter, but especially also at the outlet from the filter. In this way, it is ensured that the air remains dissolved in the oil on the outlet side and a violent expansion of the small bubbles and possibly also due to release of air from the dissolved state can be avoided.

In this way, the per se conventional filtration of the oil to separate it into a solid phase and a filtrate can be carried out efficiently without any disturbing influence from air bubbles.

One might think that the very idea that the air content is maintained in the oil when it is returned to the machinery could cause trouble in the machinery. However, in case of a wind turbine gearbox, it was found that when fresh oil without air bubbles is used, the incorporation of air in the gearbox is very fast and air-containing oil with the typical air content as in the contaminated used oil is generated within about 6 minutes of operation.

The extent of applicability of the invention appears from the following drawings and detailed description. It should, however, be understood that the detailed description and the specific examples are merely included to illustrate the preferred embodiments, and that various alterations and modifications within the scope of protection will be obvious to persons skilled in the art on the basis of the detailed description.

DETAILED DESCRIPTION OF THE INVENTION

Figure 1:
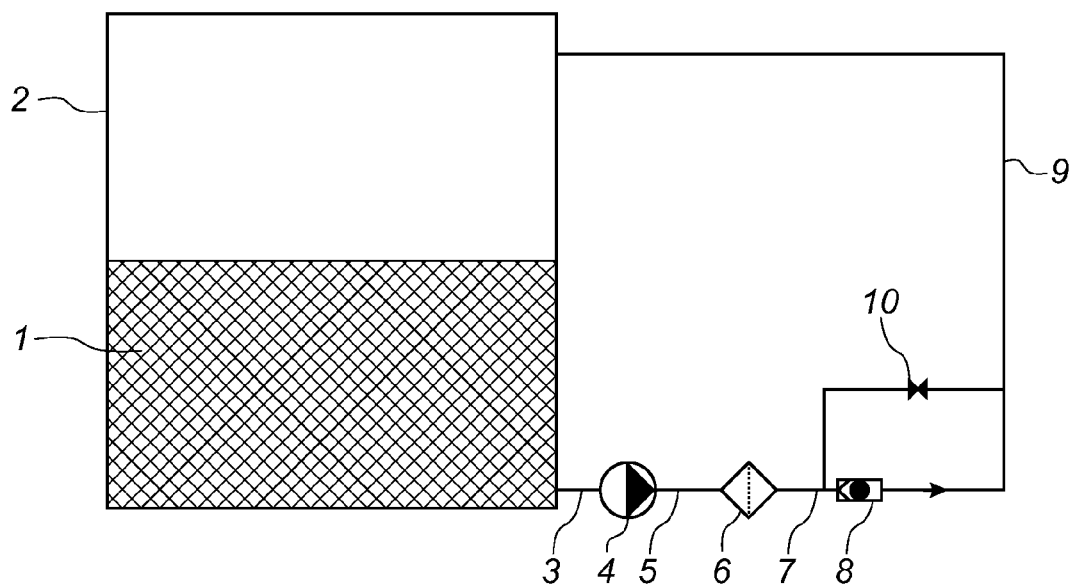
FIG. 1 is a schematic presentation of the inventive method and device with filtration of oil and recycling of the filtrate.

Referring to FIG. 1 a contaminated oil 1 in an oil reservoir 2 is conducted in a conduit 3 to a pump 4. From the pump 4, the oil is conducted under pressure in a conduit 5 to a filter 6 separating the contaminated oil into a solid material and decontaminated oil as filtrate. The filtrate is conducted in a conduit 7 through a valve 8. The valve 8 may be any suitable valve or other hydraulic resistance able to provide a sufficient back pressure after the filter 6 in the conduit 7. Examples are any type of regulating valves, including a one way valve (non-return valve), a reduction valve, or a manual valve or another hydraulic resistance, including an orifice plate or simply a narrowing of the filter outlet. From the valve 8, the filtrate may be recycled to the reservoir 2 through a conduit 9. The device shown in FIG. 1 also has a by-pass valve 10 which was used in the experimental test runs referred to below.

The pump 4 provides a sufficient pressure in the conduit 5 to overcome the pressure drop caused by the filter 6 and the valve 8. The passage through the filter 6 gives a fall in pressure, but according to the invention, the back pressure in the conduit 7 after the filter must be sufficient to maintain the incorporated air in dissolved form in the oil and hinder liberation of air bubbles from the oil during the passage of the filter. Thus, the air will first be released after the valve 8. Depending on the actual air content in the oil and the type of oil, the back pressure in conduit 7 should preferably be above 0.3 bar (0.03 MPa), more preferably above 0.8 bar (0.08 MPa) such as above 1.2 bar (0.12 MPa), and generally not more than 5 bar (0.5 MPa), preferably not more than 2 bar (0.2 MPa) such as not more than 1.8 bar (0.18 MPa).

Example

Experimental Procedures

Experiments have been carried out on an automated test bench arranged as shown in FIG. 1 to determine the effect of froth-forming air when filtering oil. The filter was a 3 μm cellulose-based depth filter (CJC Fine Filter HDU 15/25 PV with a CJC Filter Insert BG 15/25; available at C. C. Jensen A/S, Svendborg, Denmark). This filter consists of several discs stacked and bonded together. The material is basically cellulose. The filter insert has a filtration degree of 3 μm absolute and 0.8 μm nominal. This means that 98.7% of all solid particles larger than 3 μm and approximate 50% of all particles larger than 0.8 μm are retained in one pass.

The test bench is provided with controllable oil flow, accurate temperature control, accurate sensors to measure pressure before the filter, and particle content before and after the filter.

Before each test, 60 liters of contaminated gear oil (Mobilgear SHC XMP 320, having average viscosity at 40° C. of 320 mm$^2$/s; ISO VG 320 according to DIN 51 519) was added to the oil reservoir. Air bubbles to form froth were incorporated artificially with a leakage on the suction side of a rotary gear pump. The amount of non-dissolved air bubbles was about 10 vol/vol %. On standing at room temperature, this artificially prepared froth becomes clear after about 10 hours corresponding to bubble sizes of about 40 μm estimated on the basis of Stokes law. This observation is similar to the one seen with the contaminated oil from a wind turbine gearbox.

The tests were carried out at 50° C. with a flow rate of 45 l/h. The cleanliness was measured as ISO 4406 rating for the number of particles larger than 4 μm per milliliter with a particle counter (PC1) on the dirty side before the filter, and with another particle counter (PC2) on the clean side of the filter.

The pressure after the filter, the back pressure (BP), was adjustable using the valve 10 open (BP~atmospheric pressure) or closed in which case the pressure was determined by a check valve 8. The pressure was only measured before the filter. With open valve 10 this pressure was 0.4 bar (0.04 MPa), corresponding to the pressure drop over the filter. Based on the test runs reported below, the pressure drop over the filter may be considered almost constant about 0.4 bar (0.04 MPa).

Table 1 shows the number of particles per milliliter according to ISO 4406:

TABLE 1

| ISO 4406 Range Number | Greater Than | Less Than |
|---|---|---|
| 24 | 80,000 | 160,000 |
| 23 | 40,000 | 80,000 |
| 22 | 20,000 | 40,000 |
| 21 | 10,000 | 20,000 |
| 20 | 5,000 | 10,000 |
| 19 | 2,500 | 5,000 |
| 18 | 1,300 | 2,500 |
| 17 | 640 | 1,300 |
| 16 | 320 | 640 |
| 15 | 160 | 320 |
| 14 | 80 | 160 |
| 13 | 40 | 80 |
| 12 | 20 | 40 |
| 11 | 10 | 20 |
| 10 | 5 | 10 |
| 9 | 2.5 | 5 |
| 8 | 1.3 | 2.5 |
| 7 | 0.64 | 1.3 |
| 6 | 0.32 | 0.64 |
| 5 | 0.16 | 0.32 |
| 4 | 0.08 | 0.16 |
| 3 | 0.04 | 0.08 |
| 2 | 0.02 | 0.04 |
| 1 | 0.01 | 0.02 |

Results
Test Run 1

Figure 2:
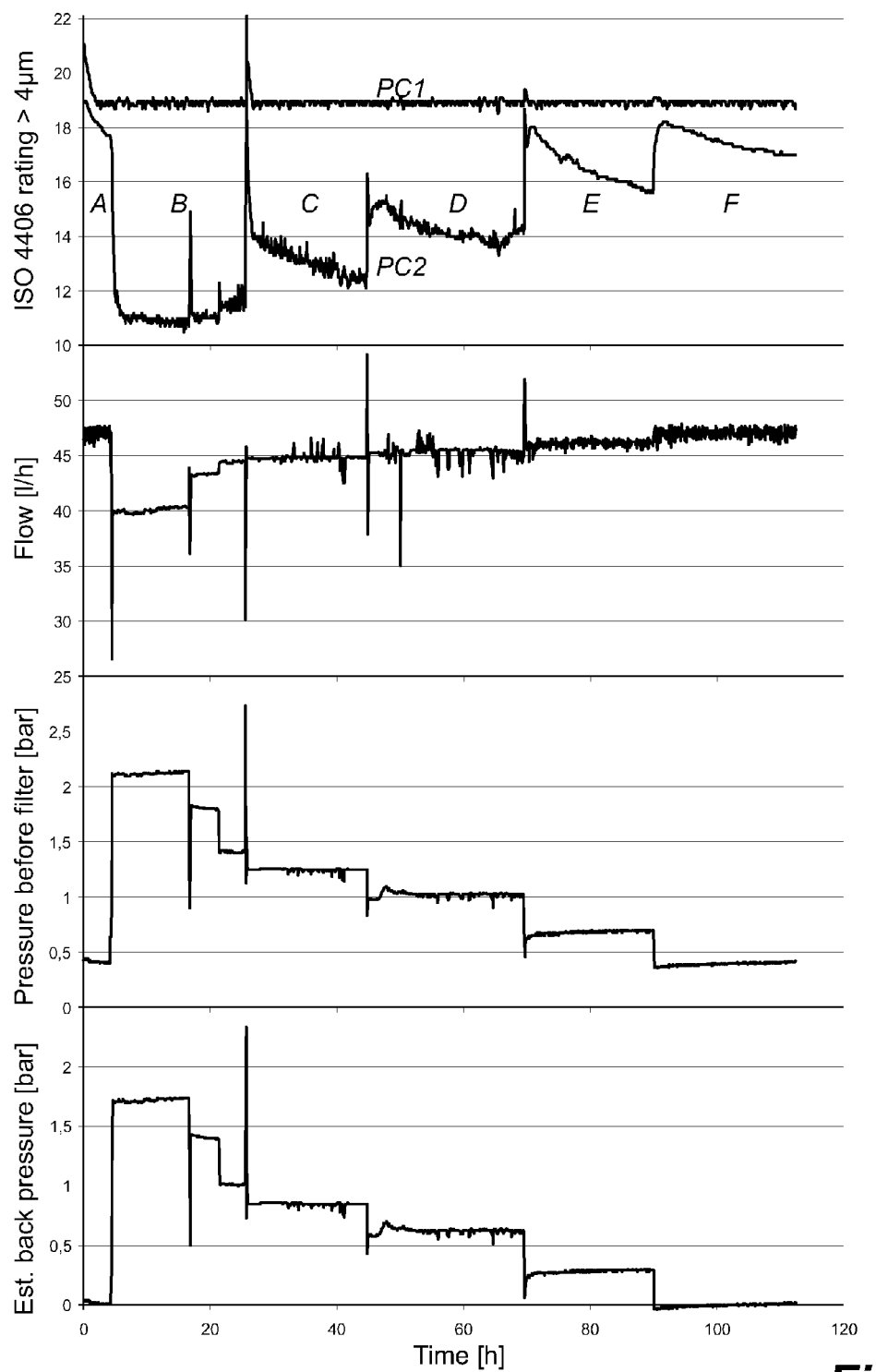
FIG. 2 is a graph from a test run during about 110 hours. The first graph from the top shows the cleanliness expressed as the ISO 4406 rating>4 μm before (PC1) and after (PC2) a filter. The second graph shows the flow in l/h, and the third graph shows the pressure before the filter (PBF) in different periods (A through F). The fourth graph at the bottom shows the pressure of the filtrate as "estimated back pressure" (BP) after the filter. The BP is estimated to be about 0.4 bar (0.04 MPa) below PBF.

FIG. 2 (first graph at the top) shows the results of the cleanliness according to ISO 4406 rating for particles larger than 4 μm versus time on the dirty side before the filter (PC1), and on the clean side after the filter (PC2) from a test run with different hydraulic resistances each in periods of about 24 hours. FIG. 2. (second graph) shows the oil flow in l/h, FIG. 2 (third graph) shows the pressure between the pump and the filter (pressure before filter; PBF) in bars (=0.1 MPa), and the fourth graph shows the pressure after the filter as "estimated back pressure" (BP) in bars. The valve 10 was open in the first period (A) and last period (F) during which the pressure before the filter (PBF) was about 0.4 bar (0.04 MPa) in both cases indicating that the pressure drop over the filter did not change during the test run.

After the first period (A) with open valve 10, a back pressure (BP) was established by closing the valve 10 and regulating the valve 8.

It appears from FIG. 2, that in period (B) the back pressure (BP) was 1.75 bar (0.175 MPa) and the cleanliness was improved by a drop of 8 ISO 4406 rating classes from 19 to 11. In period (D), the back pressure (BP) was 0.065 bar (0.065 MPa), and the cleanliness was improved by a drop of 5 ISO 4406 rating classes from 19 to 14. In the last period (F) with no back pressure, the cleanliness dropped only 1 or 2 ISO 4406 rating classes from 19 to 18-17.

Further details appear from FIG. 2.

As it appears from Table 1, a drop from 19 to 14 (period D) corresponds to a drop from 2500-5000 particles per ml to 80-160 particles per ml.

Test Run 2

A further test run was carried out starting with a back pressure (BP) of 0.05 bar (0.005 MPa) in the first 2 hours and then with a back pressure of 0.8 bar (0.08 MPa) in the following 6 hours. The difference between the cleanliness on the dirty and clean side of the filter is only approximately 0.2 ISO-classes with low back pressure (BP=0.005 MPa) in the first 2 hours, whereas the increased back pressure (BP=0.08 MPa) gave a very clear improvement of the cleanliness of the filtrate having an ISO 4406 rating below 8 (=1.3 to 2.5 particles larger than 4 μm per ml) with rating above 11 (=10 to 20 particles/ml) before the filter at the end of the test.

Due to the increased pressure, the oil in the filter housing became much more clear and oil-like indicating that the froth-forming air bubbles were dissolved in the oil.

Test Run 3

A further test was made starting with a back pressure (BP) of 0.8 bar (0.08 MPa). After 2 hours, the back pressure was increased to 2.0 bar (0.2 MPa). In the first period, the difference between the cleanliness on the dirty and clean side of the filter was approximately 4 ISO-classes with back pressure (BP=0.08 MPa). In the second period with increased back pressure (BP=0.8 MPa), the cleanliness dropped further about 3 ISO classes corresponding to a cleanliness, which is 8 times cleaner being a considerable improvement.

BEST MODE FOR CARRYING OUT THE INVENTION

The inventive method and device is especially useful for removal of solid contaminants in viscous lubrication oils, which during use take up air from the surrounding atmosphere under formation of bubbles at high shear agitation, resulting in a dispersion (froth) of fine air bubbles in the oil. An example of such lubrication oil is the used gear oil from wind turbines.

The above description of the invention reveals that it is obvious that it can be varied in many ways. Such variations are not to be considered a deviation from the scope of the invention, and all such modifications, which are obvious to persons skilled in the art, are also to be considered as comprised by the scope of the succeeding claims.

The invention claimed is:

1. A method for removal of solid contaminants from air-containing, gear lubrication oil, the method comprising:
   leading the oil to the inlet of a pump and pumping it further to the inlet of a filter separating the contaminated oil into a solid phase, for retention by the filter, and a liquid phase, which passes the filter and leaves as a filtrate through the outlet of the filter;
   maintaining the filtrate in the outlet of the filter immediately after the filter at a back pressure of at least 0.3 bar (0.03 MPa) with a device configured to provide hydraulic resistance at the outlet of the filter, thereby maintaining incorporated air in the air-containing oil in dissolved form in the oil and hindering liberation of air from the oil during the passage of the oil through the filter; and
   returning the oil to the gearbox after passing through the device.

2. The method as claimed in claim 1, wherein the back pressure of the filtrate in the outlet is maintained by means of hydraulic resistance downstream from the filter.

3. The method as claimed in claim 2, wherein the device configured to provide hydraulic resistance on the outlet side of the filter is a valve, an orifice plate, or a narrowing of the filter outlet.

4. The method as claimed in claim 1, wherein the air-containing oil is a lubrication oil.

5. The method as claimed in claim 1, wherein the oil before incorporation of air during use has an average viscosity at 40° C. between 200 and 1000 mm$^2$/s according to DIN 51 519 in place as of Mar. 19, 2008.

6. The method as claimed in claim 1, wherein the filtrate in the outlet of the filter is maintained at a pressure of 0.3 bar to 5 bar (0.03 to 0.5 MPa).

7. The method as claimed in claim 1, wherein the filtrate in the outlet of the filter is maintained at a pressure of 0.8 bar to 2 bar (0.08 to 0.2 MPa).

8. A method for removal of solid contaminants from air-containing, contaminated lubrication oil in a wind turbine gearbox lubrication system, the method comprising:
   receiving air-containing, contaminated oil from a wind turbine gearbox in a turbid condition;
   leading the oil to the inlet of a pump and pumping it further to the inlet of a filter separating the contaminated oil into a solid phase, for retention by the filter, and a liquid phase, which passes the filter and leaves as a filtrate through the outlet of the filter;
   maintaining the filtrate in the outlet of the filter immediately after the filter at a back pressure of at least 0.3 bar (0.03 MPa) at the outlet of the filter, thereby maintaining incorporated air in the air-containing oil in dissolved form in the oil and hindering liberation of air from the oil during the passage of the oil through the filter; and
   returning the filtrate to the wind turbine gearbox.

9. The method as claimed in claim 8, further comprising maintaining the back pressure of the filtrate with a back pressure valve.

10. The method as claimed in claim 8, wherein the oil before incorporation of air during use has an average viscosity at 40° C. between 200 and 1000 mm$^2$/s according to DIN 51 519 in place as of Mar. 19, 2008.

11. The method as claimed in claim 8, further comprising maintaining the filtrate in the outlet of the filter at a pressure of 0.3 bar to 5 bar (0.03 to 0.5 MPa).

12. The method as claimed in claim 8, further comprising maintaining the filtrate in the outlet of the filter at a pressure of 0.8 bar to 2 bar (0.08 to 0.2 MPa).

13. The method as claimed in claim 8, wherein the oil received from the wind turbine gearbox at atmospheric pressure comprises between 5-20% vol/vol of free air dispersed as bubbles in the oil, and between 8-12% vol/vol of air dissolved in the oil.

* * * * *